United States Patent
Dias et al.

(10) Patent No.: US 10,345,611 B2
(45) Date of Patent: Jul. 9, 2019

(54) ILLUMINATION SYSTEM

(71) Applicant: ams Sensors Singapore Pte. Ltd., Singapore (SG)

(72) Inventors: Daniel Dias, Ruschlikon (CH); Ville Kettunen, Ruschlikon (CH); Markus Rossi, Jona (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 912 days.

(21) Appl. No.: 14/517,225

(22) Filed: Oct. 17, 2014

(65) Prior Publication Data
US 2015/0070870 A1 Mar. 12, 2015

Related U.S. Application Data

(62) Division of application No. 12/599,919, filed as application No. PCT/CH2008/000210 on May 7, 2008, now Pat. No. 9,400,394.

(60) Provisional application No. 60/917,723, filed on May 14, 2007.

(51) Int. Cl.
| | |
|---|---|
| F21V 5/00 | (2018.01) |
| G02B 5/18 | (2006.01) |
| F21V 33/00 | (2006.01) |
| G02B 27/30 | (2006.01) |
| G03B 15/05 | (2006.01) |

(52) U.S. Cl.
CPC .............. *G02B 27/30* (2013.01); *F21V 5/00* (2013.01); *F21V 5/002* (2013.01); *G02B 5/18* (2013.01); *G02B 5/1885* (2013.01); *F21V 33/0052* (2013.01); *G03B 15/05* (2013.01)

(58) Field of Classification Search
CPC .......... F21V 13/04; F21V 5/04; F21V 7/0091; F21V 5/046; F21V 5/002; F21S 48/1233; F21S 5/00; F21S 4/003; F21W 211/02; F21Y 2101/02; F21K 9/00
See application file for complete search history.

(56) References Cited

U.S. PATENT DOCUMENTS

| | | | | |
|---|---|---|---|---|
| 1,556,158 A | * | 10/1925 | Patch | F21S 48/1233 362/337 |
| 4,796,171 A | * | 1/1989 | Lindae | F21V 5/002 362/308 |
| 5,442,413 A | | 8/1995 | Tejima et al. | |

(Continued)

FOREIGN PATENT DOCUMENTS

| | | |
|---|---|---|
| EP | 0 738 904 | 10/1996 |
| EP | 1420462 | 5/2004 |

(Continued)

*Primary Examiner* — Alexander K Garlen
(74) *Attorney, Agent, or Firm* — Fish & Richardson P.C.

(57) ABSTRACT

An illumination system including at least one light source such as an electroluminescent element, e.g. a light emitting diode (LED), and at least one optical element whose surface is structured by diffraction and/or refraction type optical microstructures. In order to shape the beam, the optical element includes at least two sections whose optical microstructures and therefore optical properties are different from one another. The pattern of the microstructures in each of the at least two sections is, at least over a predetermined angular range, rotationally symmetric with respect to the optical axis or another symmetry axis.

22 Claims, 9 Drawing Sheets

(56) References Cited

U.S. PATENT DOCUMENTS

| | | | | |
|---|---|---|---|---|
| 5,577,492 A | * | 11/1996 | Parkyn, Jr. | G02B 19/0028 |
| | | | | 126/698 |
| 5,930,055 A | | 7/1999 | Eisenberg | |
| 6,286,970 B1 | * | 9/2001 | Egawa | G02B 6/0028 |
| | | | | 362/556 |
| 7,101,062 B2 | * | 9/2006 | Albou | F21S 41/28 |
| | | | | 362/299 |
| 7,483,220 B2 | * | 1/2009 | Kittelmann | F21L 4/005 |
| | | | | 359/742 |
| 7,548,376 B2 | * | 6/2009 | Kim | G02B 3/0056 |
| | | | | 359/628 |
| 7,701,648 B2 | * | 4/2010 | Amano | F24J 2/085 |
| | | | | 359/742 |
| 8,487,519 B2 | * | 7/2013 | Kettunen | G02B 3/0037 |
| | | | | 313/110 |
| 2006/0092636 A1 | * | 5/2006 | Potucek | F21S 8/00 |
| | | | | 362/244 |
| 2006/0113701 A1 | | 6/2006 | Rudmann et al. | |
| 2007/0216046 A1 | | 9/2007 | Rudmann et al. | |
| 2007/0216047 A1 | | 9/2007 | Rudmann et al. | |
| 2007/0216048 A1 | | 9/2007 | Rudmann et al. | |
| 2007/0216049 A1 | | 9/2007 | Rudmann et al. | |

FOREIGN PATENT DOCUMENTS

| | | |
|---|---|---|
| EP | 1521044 | 4/2005 |
| GB | 692569 | 6/1953 |
| JP | 02263339 | 10/1990 |
| WO | 0135154 | 5/2001 |
| WO | 2004044995 | 5/2004 |
| WO | 2004068198 | 8/2004 |

* cited by examiner

ILLUMINATION SYSTEM

BACKGROUND OF THE INVENTION

Field of the Invention

The invention relates to an illumination system including at least one light source such as an electroluminescent element, e.g. a light emitting diode (LED), and at least one optical element whose surface is structured by means of diffraction and/or refraction type optical microstructures. The invention further relates to an optical element whose surface is structured by means of diffraction and/or refraction type optical microstructures, and to a collimating lens with such an optical element or such an illumination system.

Description of Related Art

LEDs are well known in the art, are available for a large variety of wavelengths, emitting powers and other properties and are used for many appliances. A key problem related to using LED sources is the fact that light emitted by a LED can not be easily shaped or collimated. This is due to the fact that a LED is an extended light source with an active area of typically a few tens of micrometers up to a few millimeters, and, therefore, has an output light distribution that extends over a broad angular range. In order to collimate or otherwise shape the emitted light beam, an external optical system has to be arranged next to the LED.

Collimation by single sided diffractive lenses, such as Fresnel zone plates, is known in the art. Furthermore, WO 2004/044995 suggests to arrange a micro-optical element with diffraction and/or refraction type optical microstructures on one of its surfaces next to the light source to collimate and/or otherwise shape the initial, typically Lambertian light distribution. WO 2004/044995 also proposes to use a micro-optical element with a plurality of independent sections, wherein each section has an individual optical function. WO 2004/044995 mentions a plurality of different possible functions of the micro-optical element. However, WO 2004/044995 is silent as to the concrete design of the optical element necessary to achieve these functions.

U.S. Pat. No. 5,577,492 discloses a lens using classical refractive optics to collimate radiant energy, e.g. solar light or light of a LED. The lens has two different sections. An inner section is shaped to focus light by means of a convex or a Fresnel lens. A ring-shaped outer section comprises a saw-tooth-like profile with a plurality of macroscopic facets. These facets are shaped in such a way that a ray entering the lens in the outer section is subject to Total Internal Reflection (TIR) at one side of the facet. U.S. Pat. No. 5,577,492 proposes to use a lens with only a few facets if light of a LED is to be collimated. Consequently, no optical microstructures are involved.

BRIEF SUMMARY OF THE INVENTION

It is an objective of the present invention to improve an illumination system having at least one light source and at least one micro-optical element comprising at least two sections with different optical microstructures in such a way that the ability to shape the beam in a desired way is enhanced.

Especially, it would be desirable to have a solution that allows better collimation of the light distribution of light emitted by an LED.

It would also be desirable to have a solution that allows generation of a rotationally asymmetric, e.g. rectangular, output light distribution.

It is a further object of the invention to provide a structure having small dimensions such that it can easily be implemented in small electronic devices, such as mobile phones or the like. Here, it is especially desirable to provide a collimating lens that is suited for the flash light of digital cameras, e.g. as comprised in some mobile phones.

The present invention uses, among others, micro-optics. Micro-optics, as opposed to conventional optics, uses elements having fine structures that are such that the wave nature of the light has to be taken into account and participates in the effect the micro-optical element has upon radiation, in particular by refraction and/or diffraction. In the context of the present invention, these structures are called optical microstructures, and the involved optical elements are called micro-optical elements. The optical microstructures have characteristic profile depths and profile widths of the order of a few wavelengths up to a few tens of wavelengths for refractive optics and of about one wavelength up to a few wavelengths for diffractive optics. For example, the characteristic depths/heights and often also widths are of typically a few micrometers, for example of 0.5 µm-200 µm, preferably of between 1 µm and about 50 µm or between 1 µm and about 30 µm. As a rule of thumb, micro-optical elements have structures such that the phase relation of radiation present at different neighboring places on the structure is well-defined. This is opposed to classical, purely refractive optical elements, where the behavior of the radiation at different elements of the structure can be described in a geometrical optics model, and the wave nature is disregarded.

Due to this principle and contrary to conventional, purely refractive optical elements like spherical lenses, such micro-optical elements have the potential to shape the initially emitted light in almost any manner. This is especially beneficial in combination with one or more LED(s) as a light source. A further advantage is that micro-optical elements can be shaped essentially flat and can be manufactured in a mass process, e.g. by imprinting the desired profile on a transparent substrate.

A further benefit of optical elements with optical microstructures is that the substrate comprising the structure can be essentially flat. A typical substrate thickness is 0.5 mm, a preferred range is 300 µm to 1.1 mm. The substrate is, for example, an at least partially transparent layer of a plastic material or a resin.

Another benefit of optical microstructures is that they can be produced in a cost efficient way in a mass production process by a replication technique, such as embossing or molding, preferably on a wafer-scale. Preferred manufacturing methods are described in the co-pending U.S. patent application Ser. No. 10/541,008 (published as US 2006/0113701 and WO 2004/068198), Ser. Nos. 11/384,562, 11/384,563, 11/384,537, and 11/384,558 which are incorporated herein by reference.

An illumination system according to a first aspect of the invention comprises at least one light source and at least one optical element arranged along an optical axis. The optical element has a first surface (front surface) directed towards the light source and acting as an entry face for the light emitted by the light source. It further comprises a second surface (back surface) pointing away from the light source and acting as an exit face for the light. At least one of said first and second surfaces is structured by means of diffraction and/or refraction type optical microstructures. In order to achieve the desired beam shaping effect, the optical element comprises at least two sections whose optical microstructures are different from one another. The pattern of the optical microstructures in each of the at least two sections is, at least over a predetermined angular range, rotationally symmetric with respect to at least one symmetry axis. This means that within each section the pattern is the same for all points having a constant distance to the symmetry axis and lying within a predetermined angular range as seen in the azimuthal direction. The symmetry axis might be the optical axis or another axis running parallel thereto. Different sections may have different symmetry axes.

An optical element according to a further aspect of the invention has a first surface and a second surface, wherein at least one of said first and second surfaces is structured by means of at least one of diffraction type and refraction type optical microstructures. The optical element comprises at least two sections whose optical microstructures are different from one another. According to the invention each section has the shape of at least one of a circular disc, a circular ring, a sector of a circular disc, a sector of a circular ring, a stripe with two parallel straight bordering lines, and segments of such shapes.

A section may be seen as that part of the front or back surface of the optical element where the pattern of the optical microstructures is constant or varies only continuously while there is a change in the pattern between two neighboring sections, such that it is possible to define some kind of border line between these sections.

According to the first aspect of the present invention, within each individual section of the optical element, all regions that are arranged at approximately the same distance from its symmetry axis, e.g. the optical axis, have the same pattern of surface structures. For example, at a distance r1, the microstructures have a profile depth dm1 and a profile width wm1, and at a distance r2, a profile depth dm2 and a profile width wm2. Between neighboring sections, the pattern/surface structure/profile type generally changes. The symmetry requirement as presently claimed does not mean that the surface structure itself is fully symmetric on a microscopic scale.

Consequently, the shape of a section is preferably one of the following: A circular disc, a circular ring, a sector of a circular disc, a sector of a circular ring, a rectangle (corresponding to a ring segment with a symmetry axis shifted to infinity), and segments thereof ("truncated" shapes), e.g. triangles, rectangles and other shapes. Two or more sections are combined to cover, preferably, the whole front and/or back surface.

The optical element can have microstructures on the front surface, the back surface or on both surfaces. The pattern of microstructures is divided into independent sections at least on one of the surfaces that comprise microstructures, possibly also on both surfaces. It is also possible that a certain section does not contain any microstructures.

Rotational symmetry over an angular range of φ means a section that is shaped like a sector of a circle or of a circular ring, the center of which is defined by the symmetry axis, in both cases with the opening angle φ. Rotational symmetry over an angular range of φ=360° means a section that is generally shaped like a circular disc or circular ring. In general, it is possible that the sections have rotational symmetry over a very small angular range only, e.g. φ=1° or less, leading to a continuous or quasi-continuous rather than a discrete overall surface structure of the optical element, as seen in azimuthal direction (i.e. direction of φ). The optical element itself may also have a shape other than a circular disk, e.g. by trimming a circular design to give it a rectangular shape. In this case, the sections may have the shape of a truncated/segmented disc or ring or sector thereof. In this picture, a rectangle may also be seen as "truncated" circle or "truncated" 180°-sector of a circle. A triangle may be seen as a "truncated" sector of a circle with an opening angle of less than 180°. In both cases, the symmetry axis corresponds to the center of the imaginary circle.

Generally, all points within one and the same section independent of their distance r to the symmetry axis have the same pattern of microstructures. However, it is also possible that the surface structure and therefore the optical properties change continuously or discretely with r, e.g. in a section with TIR where the exact profile of the microstructures may depend on the angle of incidence and therefore on r.

The rotational symmetry simplifies the design and manufacture of the microstructures. Nevertheless, the claimed invention allows shaping of a light distribution, e.g. as emitted from a LED, according to given demands. According to preferred embodiments of the present invention, an illumination system with enhanced collimation efficiency, achieved by segmentation of the optical element in radial direction from the optical axis, and an illumination system capable of generating a rectangular or elliptic output distribution, achieved by segmentation of the optical element in azimuthal direction around the optical axis, is provided.

Off-axis geometries, i.e. those where at least one symmetry axis does not coincide with the optical axis, are beneficial if the target distribution is shifted with respect to the optical axis, for example. Furthermore, it is suited to include cases where the optical element has an optical function that is one dimensional or separable, e.g. collimation only in the x-direction or collimation in the x-direction together with beam shaping in the y-direction.

The invention comprises, for example, the following preferred embodiments:

I: One circular shaped section and one or more ring shaped sections centered around the optical axis (acting as a common symmetry axis). Here, each section has rotational symmetry over an angular range of 360° (see e.g. FIG. 7*b*). Enhanced collimation efficiency can be provided, for example.

II: Like I, but with the common symmetry axis at a distance from the optical axis. Symmetry axis in infinity corresponds to stripe-like sections (FIG. 15). This allows creation of off-axis output distributions.

III: Two or more sections shaped like sectors of a circle with a center corresponding to the optical axis (acting as a common symmetry axis) and with opening angles that add up to 360°. Here, each section has rotational symmetry over an angular range of less than 360°, corresponding to its opening angle (FIGS. 9+11). This enables creation of a rectangular or elliptic output distribution from a rotationally symmetric input distribution, for example. Two sections with an opening angle of 180° each, correspond to an optical element having two stripes separated by a straight border line, if the optical element is rectangular (FIG. 17).

IV: Like III, but with the common symmetry axis at a distance from the optical axis.

V: Like III, but with an additional variation in radial direction (combination of I and III, FIG. 13).

VI: Like III, but with an additional variation in radial direction from a further symmetry axis (combination of II and III, FIG. 16).

An illumination system of type I with at least two, preferably three sections having a common symmetry axis corresponding to the optical axis whose optical properties change with the distance r from the optical axis but not in azimuthal direction (i.e. they exhibit rotational symmetry with respect to the optical axis over an angular range of 360°), is especially advantageous to achieve improved beam collimating properties. The inner section(s) correspond to small incidence angles θ (of 0 to 40°), and the outer section corresponds to higher incidence angles θ up to 90°, where the incidence angle θ is measured between the optical axis and the direction of the emitted light. The invention allows one to chose for each region of incidence angles a specific type of optical structure with optical properties that are adapted to the desired output distribution, e.g. that achieve the desired deflection with a given efficiency. According to a preferred embodiment of the invention, an outer section corresponding to higher incidence angles has microstructures utilizing TIR, thereby achieving high deflection angles especially for high incidence angles at a much higher efficiency than classical convex lenses or "normal" diffracting or refracting microstructures. For lower incidence angles, i.e. in the inner section(s), refracting and/or diffracting microstructures on one or both surfaces are used. "Normal" diffracting or refracting microstructures experience only refraction at the material interface, while TIR structure experiences refraction at the material interface and total internal reflection inside the microstructure. This will be discussed below with reference to FIGS. 3 and 4. This illumination system is especially beneficial in combination with a LED as a light source and more efficient than a single sided diffractive lens, for example.

Another preferred embodiment of the invention utilizing a structure of type III serves for generating a generally elliptic or rectangular output light distribution. Such an output distribution is desirable for illumination of a rectangular screen or for the generation of flash light for cameras, for example, if as much of the light emitted by the light source is to be utilized. Purely rotationally symmetric (i.e. over an azimuthal angular range of 360°) micro-optical elements cannot generate the required output distribution. The invention, therefore, suggests to divide the optical element into a plurality of sections, preferably at least four or eight, that have the shape of sectors of a circle and a common symmetry axis corresponding to the optical axis. These sections introduce different grades of deflection towards the optical axis and thereby make it possible to achieve the desired distribution. For some embodiments, it might be preferable to sub-divide the sectors by ring segments that have a symmetry axis corresponding to the optical axis or shifted with respect to the optical axis and the center of the sector.

A method to design an optical element according to the invention comprises the following steps, for example: Determining an optical function that has to be represented by the optical element in order to achieve a desired output distribution. Splitting the optical function in two or more sub-functions. Determining a shape of a section, e.g. defined by a certain range of incoming angles θ and/or of azimuthal angles φ and/or of distances to the optical axis, of and a pattern of microstructures for this section such that the section represents a sub-function. Combining the different sections to determine the surface structure of one optical element that comprises different individual sections.

The design method for the individual sections of the optical element can be carried out as described in WO 2004/044995, for example, which is incorporated herein by reference. This method comprises the steps of: Modeling the light emission of the light source as an array of point sources, each point source having the same angular light distribution as the electroluminescent element as a whole, whereas the intensity is optionally adapted to a local emission strength of the electroluminescent element. Optionally modeling light emission of secondary point sources corresponding to points where light leaving the light source is reflected before reaching the optical element. Designing, for the desired light beam shape, a beam shaping optic for each point source. Combining the beam shaping optics for all point sources, generating a total optical function. Generating a surface profile for the micro-optical structure according to the total optical function.

In the following, preferred embodiments of the invention are described with reference to schematic drawings.

DESCRIPTION OF THE PREFERRED EMBODIMENTS

Figure 1:
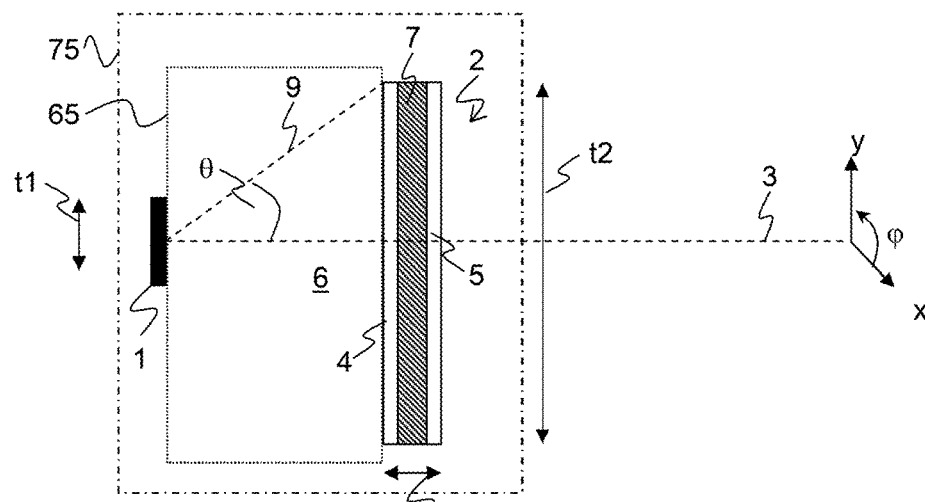
FIG. 1 shows an illumination system with a light source and an optical element with optical microstructures.

FIG. 1 shows an illumination system with a light source 1 and an optical element 2 arranged along an optical axis 3.

Here and in the following figures, "x" and "y" designate directions perpendicular to one another and to the optical axis 3. The optical element 2 has a first surface 4 acting as an entry face for the light emitted by the light source 1, and on its opposite side a second surface 5 acting as an exit face for the light emitted by the light source 1. At least one of said surfaces 4, 5 is structured by means of optical microstructures 10 (shown in FIGS. 3+4).

The light source 1, typically a LED, has a transversal dimension t1 that is small compared to the transversal dimension t2 of the optical element 2. Because of the microstructures, the optical element 2 can be manufactured with small dimensions along the optical axis; its thickness d is far smaller than its transversal dimension t2.

An optical medium 6 between the light source 1 and the optical element 2 has a first refractive index n1. This optical medium 6 may be air or another substance, e.g. a transparent resin that connects the light source 1 with the optical element 2. The optical element 2 itself comprises a further medium 7 with a second refractive index n2, where n2 is higher than n1, typically n2>1.25 and n1>1.1. Behind the optical element 2 there is a third medium 8 with refractive index n3, typically air (n3=1). Furthermore, FIG. 1 illustrates the possibility to provide that the light source 1 and the optical element 2 are arranged in a common housing 75 and/or that they are connected by an at least partially transparent substrate 65 in order to maintain a given spatial relationship between the light source 1 and the optical element 2.

Typically medium 6 is either air or some plastic material used in the protective packaging of the LED source. Medium 7 depends on the method chosen for the mass production of the element, and is typically either plastic suitable for injection molding or UV-curable epoxy (on a carrier wafer, which is typically glass).

A ray 9 is emitted under an angle θ with respect to the optical axis 3. This angle is also designated as incidence angle θ. The maximum incidence angle under which a ray falls onto the optical element is designated with $\theta_{collect}$. An angle between an arbitrary axis perpendicular to the optical axis, say the y-axis, and the projection of a ray 9 onto the x-y-plane or plane of the optical element 2 is designated as azimuthal angle φ.

Figure 2:
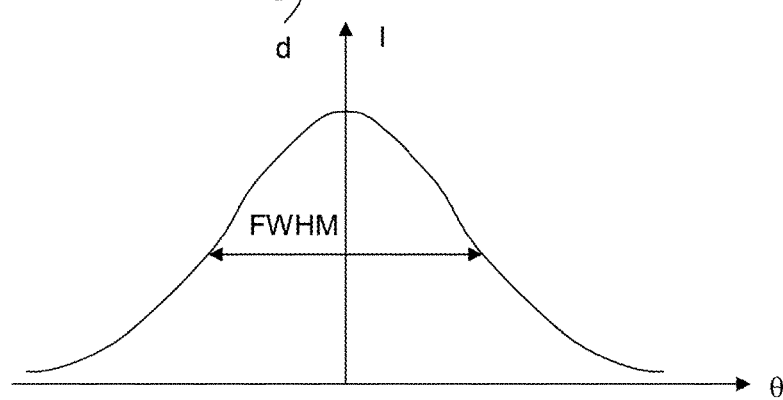
FIG. 2 shows a typical output distribution of an illumination system.

FIG. 2 shows a typical output distribution of an illumination system according to the invention. The radiant intensity I behind the optical element 2 is shown as a function of the incidence angle θ. For a collimating optical element the radiant intensity falls towards high angles θ. The intensity distribution is described by its angular width FWHM (full width at half maximum) within which the radiant intensity is about half of its maximum value. For a collimating lens, FWHM is smaller than $2\theta_{collect}$.

Figure 3:
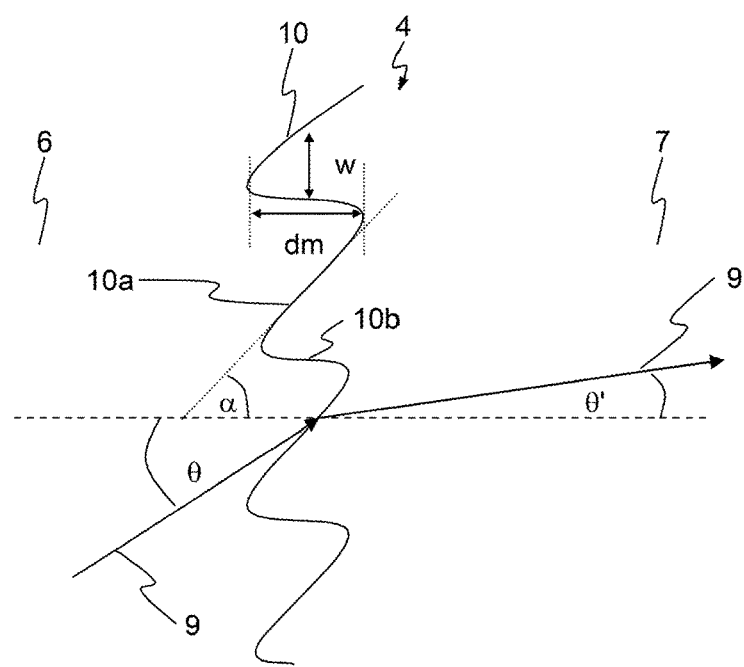
FIG. 3 shows schematically the passage of a light ray through a refraction/diffraction type microstructure at an entry face of an optical element.

FIG. 3 shows schematically, the passage of a light ray 9 through the optical element 2 at its entry surface 4 for smaller incidence angles of about 0 to 40°. The entry surface 4 is structured by means of microstructures 10. In the present example, the microstructures have a rounded saw-tooth-like profile. In the shown sectional view, the microstructures 10 comprise first flanks 10a running at an angle α of about 5-60° with respect to the optical axis 3 and second flanks 10b running generally parallel to the optical axis 3. The depth dm of the microstructures 10 is about 20 μm, and they are rounded with a width w (full width at half maximum) of about 4.5 μm, for example. The second flank 10b could run at an angle with respect to the optical axis 3 as well, e.g. at an angle of less than 30°. Furthermore, it is possible to use more complicated local structures, which would have more than two flanks. The profile length of the microstructures, given for example by the peak-to-peak-distance, is preferably 20-100 μm.

The surface 4 forms the interface between the first medium 6 that surrounds the light source 1 and the second optical medium 7 in which the microstructured surface is defined. The surface shape collimates incoming light by utilizing refraction or diffraction. The relationship between the incidence angle θ and the exit angle θ' between a ray and the optical axis 3 can be described by the following expression: sin θ>n2/n1 sin θ'.

Figure 4:
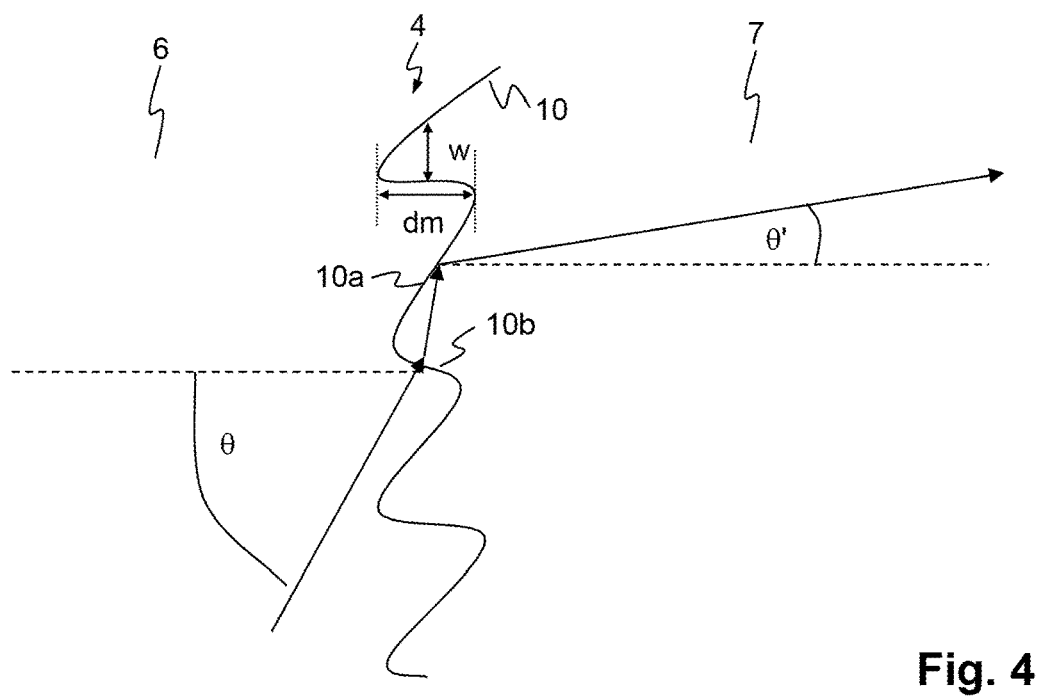
FIG. 4 shows schematically the passage of a light ray through a microstructure utilizing Total Internal Reflection.

FIG. 4 shows generally the same type of structure as in FIG. 3, this time with a light ray 9 incident under higher incidence angles θ of about 40° to about 90° with respect to the optical axis 3. The structural parameters (e.g. flank angle, depth, rounding width) might be identical to or different from those of FIG. 3. In a classical geometric picture, the incoming ray hits the second flanks 10b, is refracted toward the first flanks 10a and there reflected by means of TIR. Generally, the second flanks 10b are oriented under a small angle with respect to the optical axis. The structure is able to generate an exit angle θ' that is much smaller than the incidence angle θ.

Figure 5:
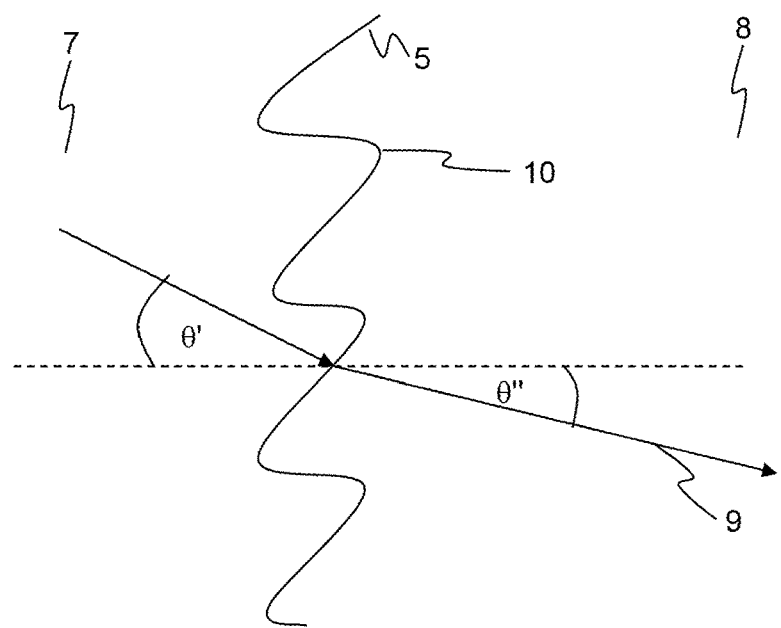
FIG. 5 shows schematically the passage of a light ray through a refraction/diffraction type microstructure at an exit face of an optical element.

FIG. 5 shows schematically the passage of a light ray 9 through refraction/diffraction type microstructures 10 at an exit face 5 of the optical element 2, i.e. the transition from the second medium 7 to the third medium 8. The angle of incidence on this face 5 corresponds to the angle θ' of FIG. 3 or 4; the resulting exit angle is denoted with θ". The same relation as with FIG. 3 is valid: sin θ'>n3/n2 sin θ".

Figure 6:
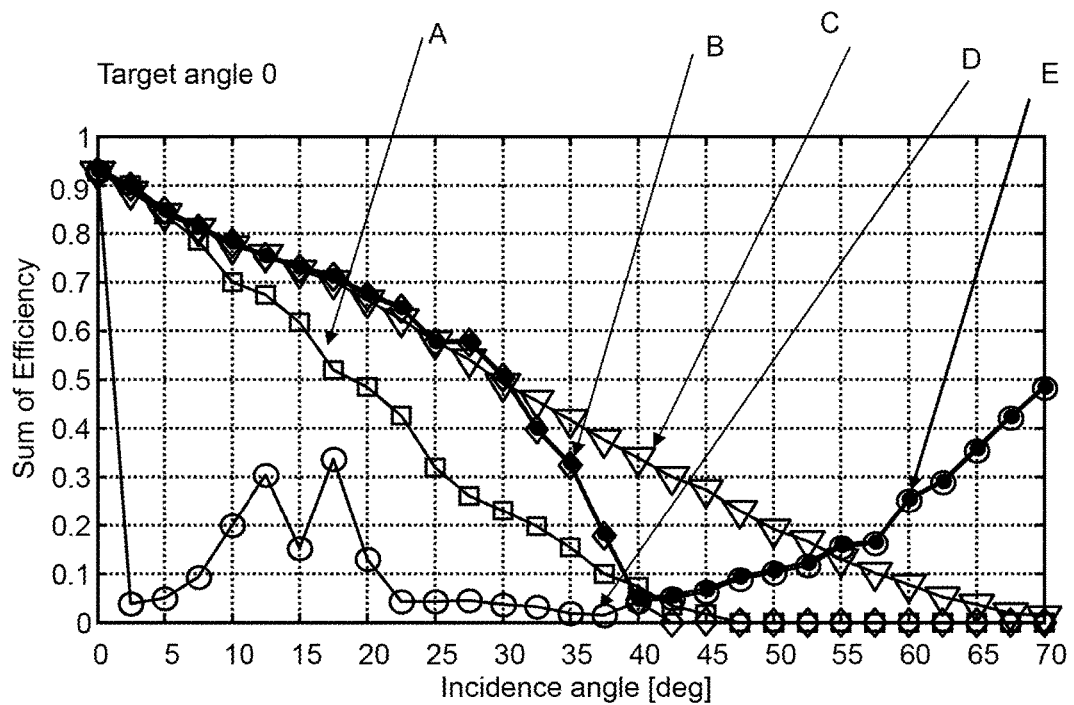
FIG. 6 shows simulation results for the achievable collimation efficiency as a function of the incidence angle.

FIG. 6 shows the achievable collimation efficiency as a function of the incidence angle θ for different types of optical elements. The curves are simulation results for plane waves with a wavelength of 550 nm incident on a microstructure with dm=20 μm and w=4.5 μm. In calculation of FIG. 6, the flank angle α was the parameter that was varied. In a more general case, one would vary both the angle α and the depth dm. And in an even more general case, one would have angles for both flanks 10a, 10b and the depth dm as free parameters. The collimation efficiency is the amount of light emitted from the LED that is deflected in the general direction of the optical axis. Typically, the angular range considered for collimation is ±5° ($\theta_{collect}$=5) and collimation efficiency is then the amount of emitted light within that angular range.

The surfaces are structured as follows:
A: refractive structures on first/entry surface and unstructured second surface
B: refractive structures on second/exit surface and unstructured first surface
C: refractive structures on both surfaces
D: standard TIR structures on first surface and unstructured second surface
E: TIR structures on first surface and refractive structures on second surface For structures A, the efficiency drops to about 50% at an incidence angle of about 25° and to less than 10° at an incidence angle of about 40°. For structures B, the efficiency drops to about 50% at an incidence angle of about 32° and to less than 10% at an incidence angle of about 40°. For structures C, the efficiency drops almost linearly to 50% at about 32° and to less than 10% at about 60°. Structures D and E show a significant (D) or slow (E) drop for angles smaller than 22° and an increasing efficiency for angles higher than 30°.

Based on these simulations, it is possible to select the structure or combination of structures that is most efficient for the purpose of the optical element. For example, for providing a collimating lens, structures A and B are efficient for collimating light at lower incidence angles of 0 to 25-40°. Structures D and E are efficient for collimating light at higher incidence angles of 40° and more. Structure C can be used in the intermediate region of about 30-55° where the efficiency of the other structures is lower.

Figure 7A:
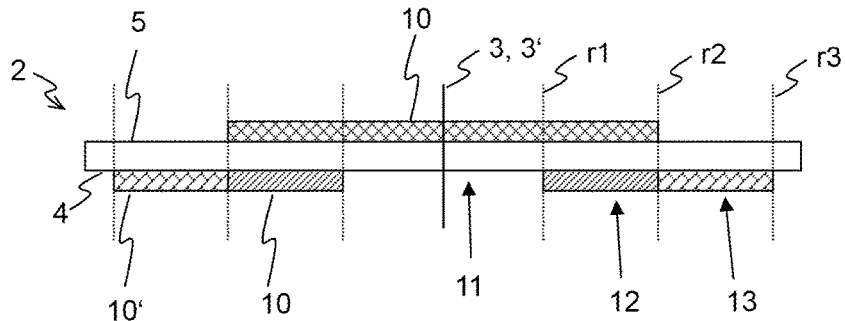
FIGS. 7a-b show, in a side view and a plan view, an optical element with increased collimation efficiency having three different sections in radial direction.
Figure 7B:
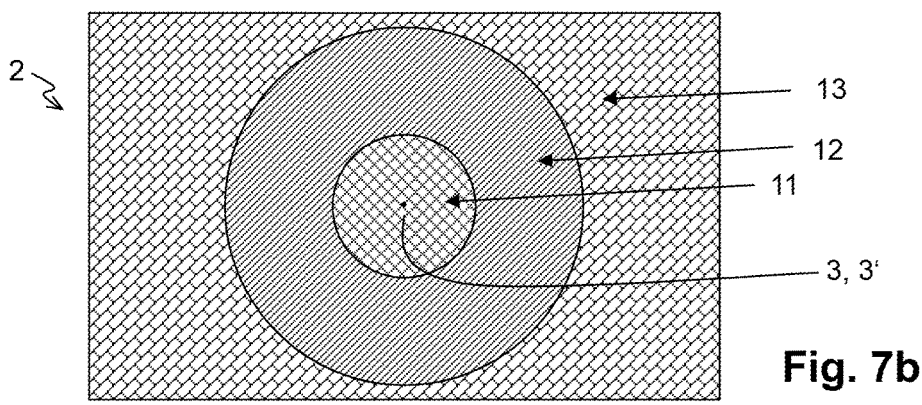

Such a lens 2 having different sections with a different type microstructure is purely schematically shown in FIG. 7a in a side view and in FIG. 7b in a top view. The optical element 2 has a rectangular shape and is subdivided into three sections 11, 12, 13 that are arranged concentrically with respect to the optical axis 3. Inner section 11 is generally circular with a radius r1. Intermediate section 12 is ring-shaped with an outer radius r2 and an inner radius r1. Outer section 13 is rectangular (corresponding to a "trunctated" circular ring) with a circular cut-out with radius r2. The sections are thus rotationally symmetric through an angular range of 360° with respect to the optical axis 3 acting as a symmetry axis 3'. The optical element itself may have other shapes, e.g. circular, quadratic, hexagonal etc. This shape may be chosen according to design requirements; in many cases it does not have much influence on the output distribution.

The three sections 11, 12, 13 are structured on their first and second surfaces 4, 5 as shown in FIG. 7a, i.e.: inner section 11 with refractive microstructures 10 on the second surface 5 (structures B); intermediate section 12 with refractive microstructures 10 on the both surfaces 4, 5 (structures C); outer section with TIR microstructures 10' on the first surface 4. The radii are, for example, chosen to fulfill the following relation: $0 \leq r1/d \leq 0.6$ (corresponding to incidence angles of 0-30°), $0.6 \leq r2/d \leq 1.26$ (corresponding to incidence angles of 30-50°), and $1.2 \leq r3/d$ (corresponding to incidence angles of more than 50°) where d is the distance of the light source 1 to the optical element 2.

Figure 8:
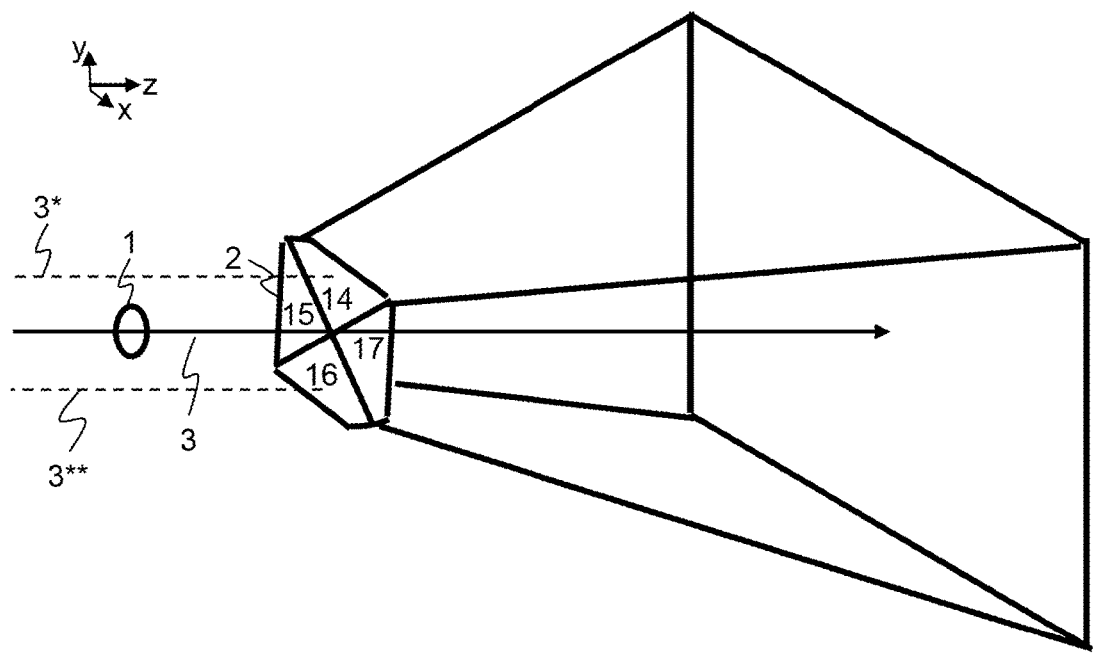
FIG. 8 shows an illumination system with an optical element having four sections shaped like sectors of a circle for generation of a generally rectangular output distribution.
Figure 9:
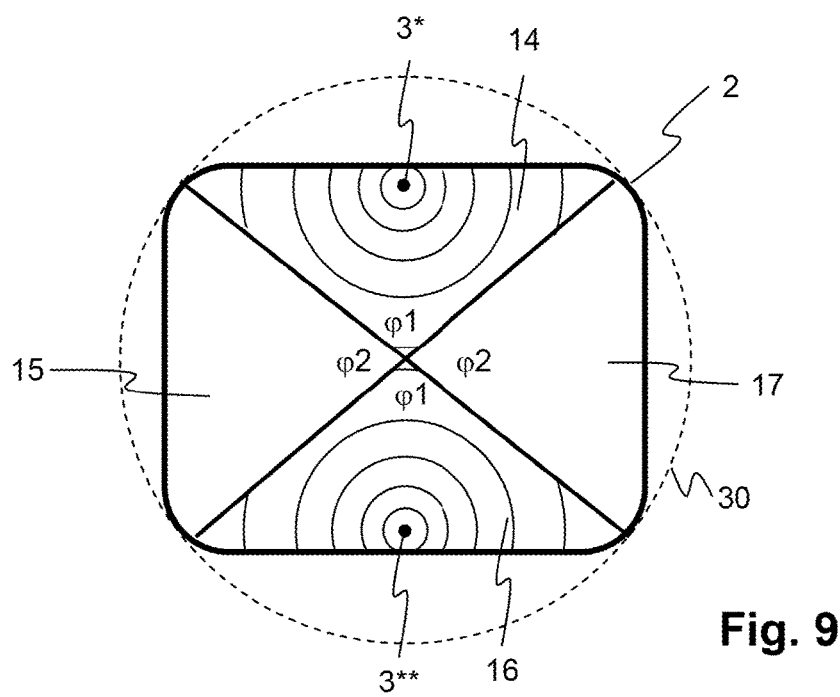
FIG. 9 shows an optical element with four sections having the shape of a sector of a circle.

FIG. 8 shows an illumination system with an optical element 2 having four sections 14, 15, 16, 17 generally shaped like ("truncated") sectors of a circle for generation of an output distribution that is approximately rectangular in a distant plane or in angular space. The optical element 2 itself is shown in FIG. 9. It is generally rectangular and is divided into four sections 14, 15, 16, 17 by the diagonals. Each of the sections 14, 15, 16, 17 has the shape of a sector of a circle 30 truncated at its periphery to give the optical element 2 a rectangular shape. The circle 30 is here purely imaginary and is shown to illustrate the symmetry condition only. It does not necessarily correspond to any physical element of the lens 2. The center of the circle/sector corresponds to the location of the optical axis 3 on the optical element 2. The optical axis 3 thus acts as a symmetry axis 3' (for the shape of the sections). Each of the sections 14, 15, 16, 17 is, thus, within itself rotationally symmetric through an angular range of $\varphi 1$ of about 80° and $\varphi 2$ of about 100°, respectively. The non-neighboring sections 14/16 and 15/17, respectively, are also congruent with respect to each other; the pattern of the optical microstructures is the same for each pair 14/16, 15/17 but different between neighboring sections. Furthermore, the dashed lines in FIG. 8 indicate symmetry axes 3* and 3** of sections 14 and 16, respectively, which are symmetry axes of a rotational symmetry of the pattern of the optical microstructures in the respective sections 14, 16. These symmetry axes 3*, 3** of the microstructure patterns are parallel to optical axis 3, and they are also indicated in FIG. 9. The concentric circular lines in sections 14 and 16 in FIG. 9 represent the rotationally symmetric patterns of the respective optical microstructures.

Figure 10A:
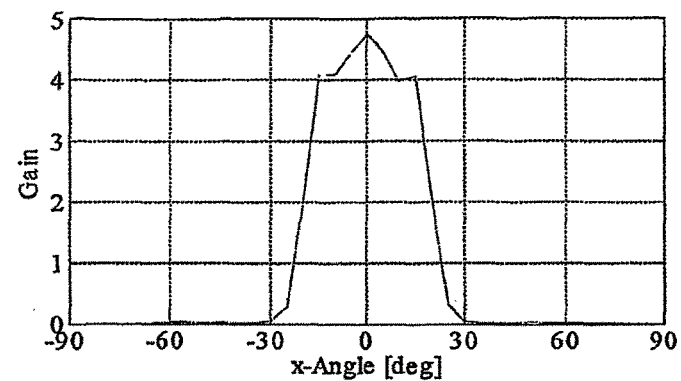
FIGS. 10a-c show the radiant intensity as a function of the output angle for three different collimating lenses.
Figure 10B:
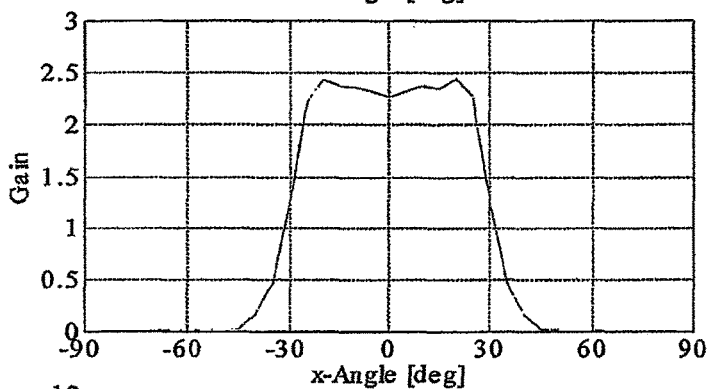
Figure 10C:
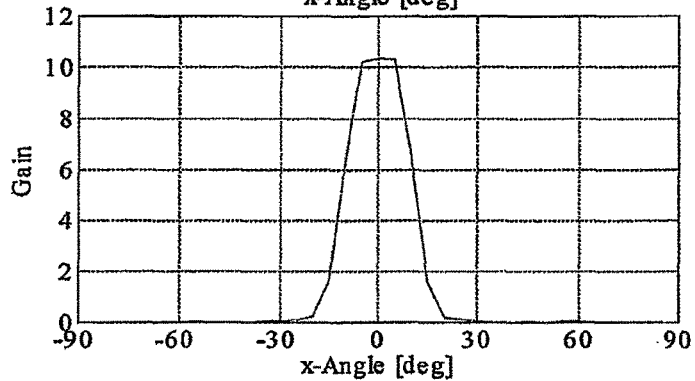

How a generally rectangular output distribution can be achieved will be discussed in the following with reference to FIGS. 10a-c, 11 and 12:

FIGS. 10a-c show the radiant intensity as a function of the output angle in one dimension, e.g. the x-dimension, for three different collimating lenses, here "standard" collimating lenses without different sections (with uniform microstructures e.g. of types A-E) as seen in a radial direction of the lens element. Additional segmentation in a radial direction, e.g. as shown in FIG. 7a+b, is also possible. Depending on the chosen microstructures, the intensity curve has a different shape and FWHM. The widths of the angular distributions correspond to the widths required in x-, y- and diagonal direction for a rectangular distribution 20 to be generated.

The distributions in FIG. 10a-c are calculated by assuming a radially symmetric element without any segmentation targeting the different FWHM's required by x-, y- and diagonal directions of a rectangular distribution to be generated. Thus, a light distribution will be collimated with an intermediate FWHM by a lens generating an output distribution as shown in FIG. 10a, with a larger FWHM by a lens generating an output distribution as shown FIG. 10b, and with a small FWHM by a lens generating an output distribution as shown in FIG. 10c. After determining the microstructures required for a desired aspect ratio of the output distribution, the elements corresponding to the distributions are used to construct the segmented optical element 2 of the type shown in FIG. 11.

Figure 11:
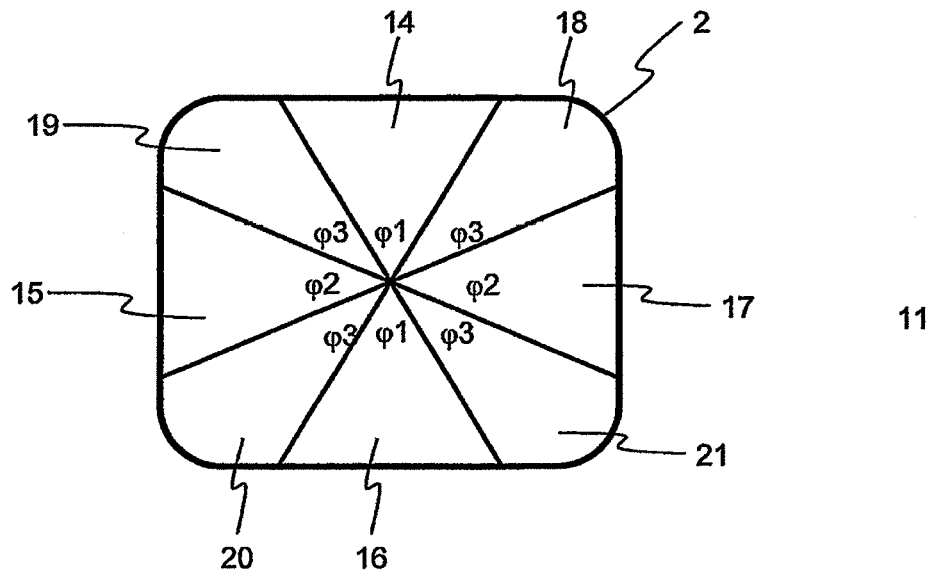
FIG. 11 shows an optical element with eight sections having the shape of a sector of a circle for an illumination system suited for the generation of a rectangular output distribution.

FIG. 11 shows an optical element 2 with eight sections 14, 15, 16, 17, 18, 19, 20, 21, that is especially suited for generation of a rectangular output distribution. Upper, lower, left and right sections 14, 15, 16, 17 correspond to those shown in FIG. 9. The four sections 18, 19, 20, 21 in the corners are added to achieve control of the angular width in a diagonal direction. Their microstructures have a less collimating effect than those of sections 14, 15, 16, 17, and lead thus to an increased angular width in diagonal direction as shown in FIG. 12c. Here, the opening angles $\varphi 1$, $\varphi 2$, $\varphi 3$ are about 30-50° and add up to 360°.

The eight sections 14, 15, 16, 17, 18, 19, 20, 21 have the shape of a sector of a circle with a symmetry axis corresponding to the optical axis, wherein at least a first pair of sections comprises a first pattern of microstructures, a second pair of sections comprises a second pattern of microstructures, and a third pair and a fourth pair of sections comprise a third pattern of microstructures. The collimating lens has rotational symmetry of order two.

The microstructures in sections 15 & 17 that collimate the incoming distribution in an x-direction correspond to those of the element shown in FIG. 10a, the microstructures in sections 14 & 16 that collimate the incoming distribution in a y-direction correspond to those of the element as shown in FIG. 10c, and the other sections correspond to the element as shown in FIG. 10b.

Figure 12:
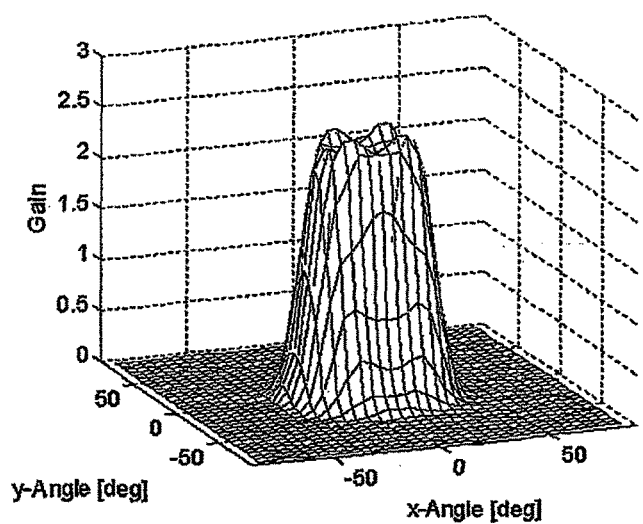
FIG. 12 shows the radiant intensity as a function of the output angle as measured in two directions perpendicular to the optical axis for an optical element as shown in FIG. 11.

The output distribution of an optical element as shown in FIG. 11 is depicted in FIG. 12. For the widths $w_x$, $w_y$, $w_{xy}$ of this distribution in the x-, y- and diagonal direction, the following relation is valid: $w_y < w_x < w_{xy}$.

Preferably, the widths are such that an aspect ratio of 4:3 or 16:9 between the width $w_x$ and height $w_y$ of the output distribution is generated.

The optical element 2 of FIG. 9 allows achievement of different angular widths in the x- and y-direction, but does not give control about the diagonal direction. Thus, an elliptic rather than rectangular output distribution 20 is achieved. For example, if the output distribution has to be narrower in the y- than in the x-dimension, the upper section 14 and the lower section 16 comprise the structure of the optical element used in FIG. 10b (stronger collimation/deflection toward the optical axis), and the left section 15 and right section 17 comprise the structure of the optical element used in FIG. 10a (medium collimation/deflection toward the optical axis). This effect is generally independent of the shape of the optical element 2 itself. For example, the optical element 2 in FIG. 9 is shown, for the purpose of illustration, to be rectangular, but may also be square or circular. For illustration of the sector shaped sections a "virtual" circle 30 is shown in dashed lines.

In order to further shape the output distribution according to one's needs, the basic principle as shown in FIG. 7a+b, i.e. variation of the optical properties in radial direction with full rotational symmetry (here with respect to the optical axis 3), can be combined with the basic principle as shown in FIGS. 9 and 11, i.e. variation of the optical properties in azimuthal direction while maintaining the same properties in radial direction as seen from the optical axis. Examples are given in FIGS. 13 and 14.

Figure 13:
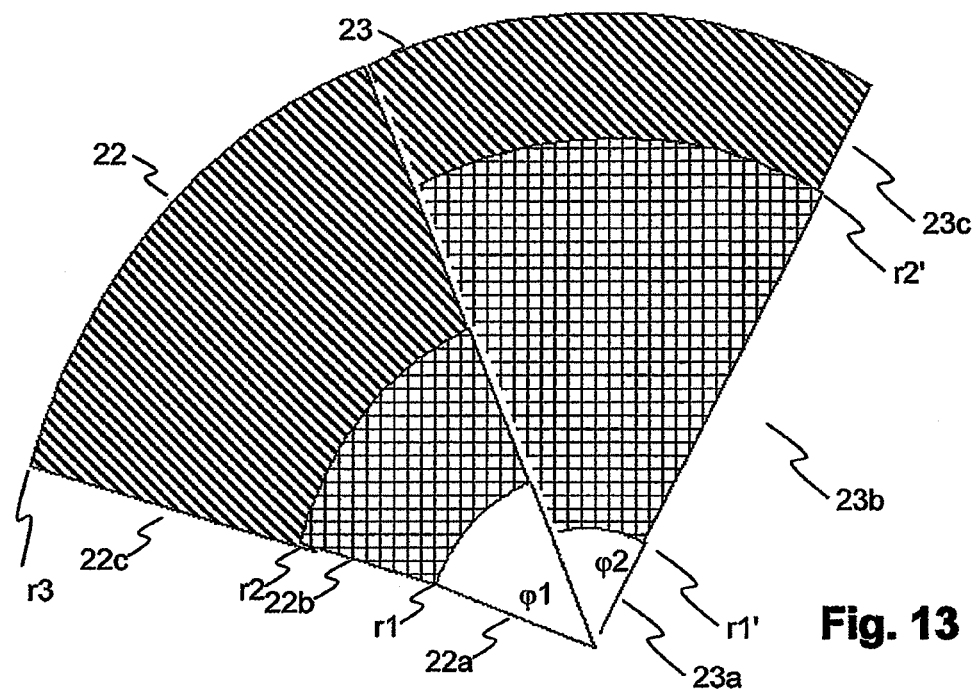
FIG. 13 shows a part of an optical element having on one surface sections in the shape of sectors of a circle that are subdivided into sub-sections in a radial direction.

FIG. 13 shows schematically two sections 22, 23 in the shape of a sector of a circle with the optical axis as center, with radius r3 and with opening angles φ1 and φ2, respectively. Each section 22, 23 is divided into three sub-sections 22a, 22b, 22c and 23a, 23b, 23c, respectively. These have the shape of ring sectors. The bordering lines between the subsections are arranged at a distance r1, r2 and r1', r2', respectively, from the optical axis. Within a section 22, 23, each subsection comprises different microstructures, e.g. of types A-E as described above. For example, each section has the structure of the optical element as shown in FIG. 7a,b.

Figure 14:
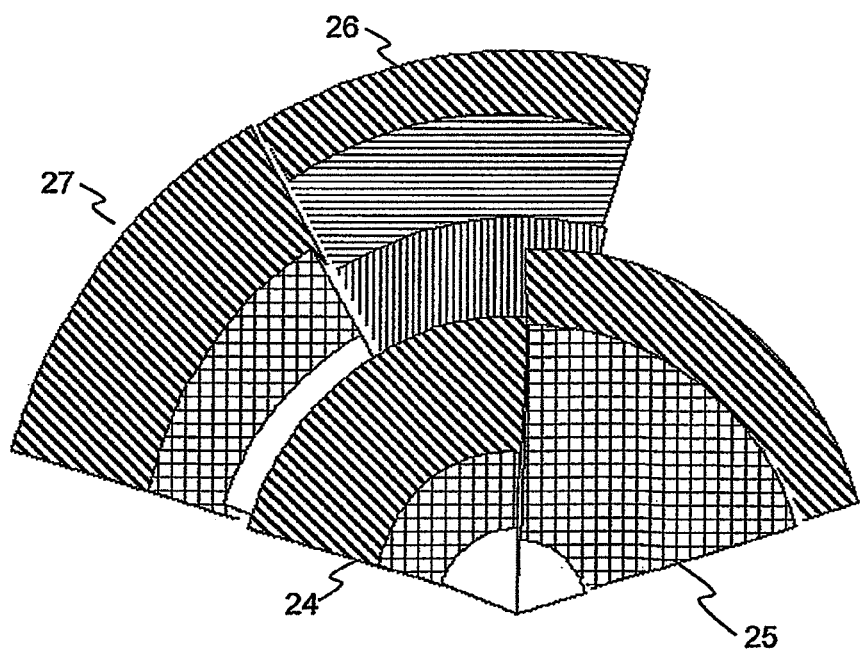
FIG. 14 shows a part of an optical element as shown in FIG. 13 with a structured first and second surface.

FIG. 14 shows, schematically, a portion of an optical element having differently structured first and second surfaces with sector-like sections as shown in FIG. 13. For example, sections 24 and 25 can be arranged on the first surface, and sections 26 can be arranged on the second surface. All sections may have different radii. Furthermore, the subsections may also have different radii as well as different microstructures. Consequently, a high freedom of design in order to shape the beam in many different ways can be achieved.

Figure 15:
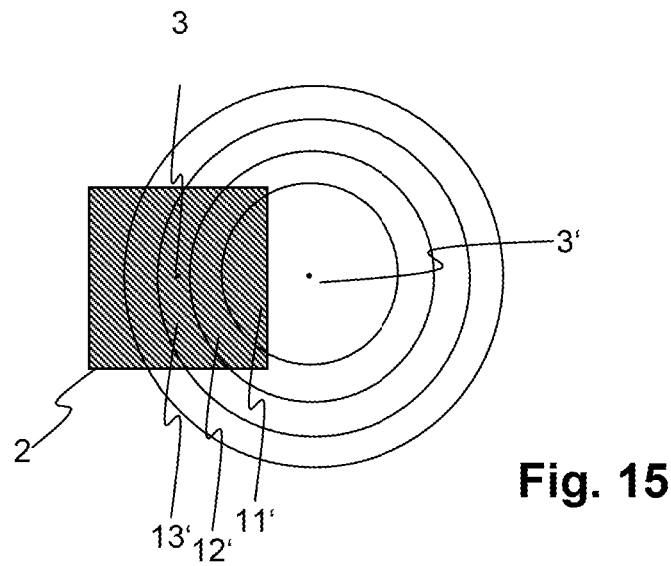
FIG. 15 shows an embodiment where a section is divided into subsections that have a symmetry axis different from the symmetry axis of the main section.

FIG. 15 shows a further example of an optical element 2 that comprises a plurality of sections that have the shape of ring segments. The optical element 2 itself is rectangular. The ring segments have a center that corresponds to a symmetry axis 3' that is shifted with respect to the optical axis 3. For a symmetry axis shifted into infinity, the ring segments approach straight lines or stripes.

Figure 16:
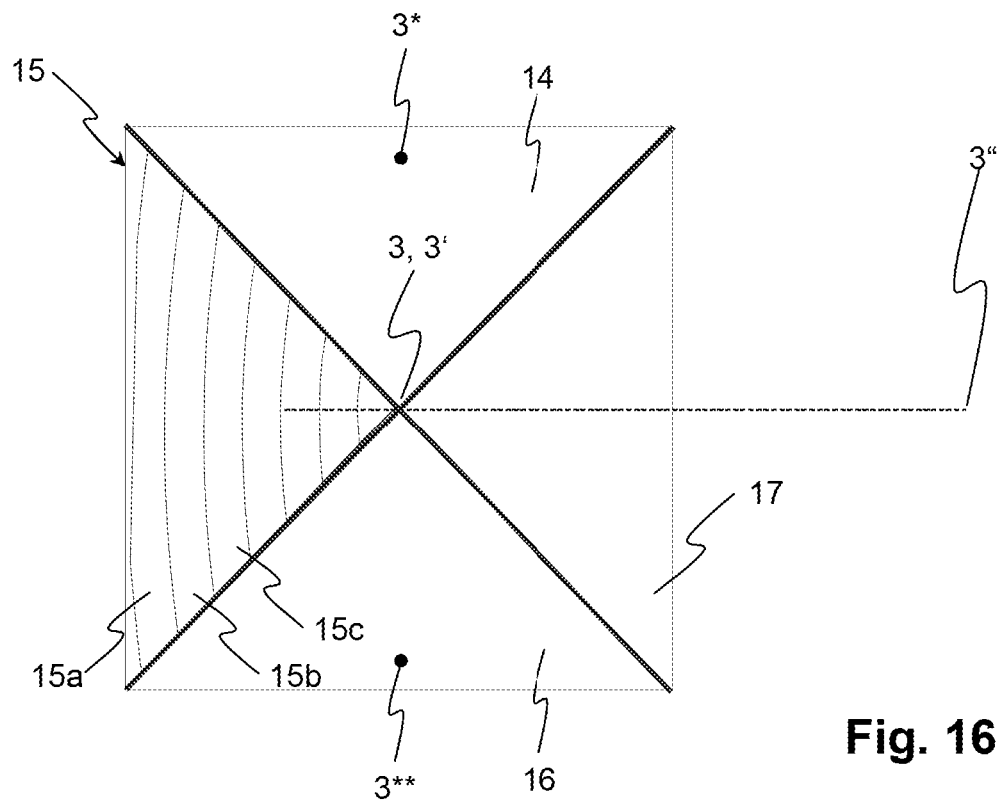
FIG. 16 shows a further embodiment of the invention based on a combination of the principles as shown in FIGS. 9 and 15.

FIG. 16 shows a further embodiment of the invention that is based on a combination of the principles as shown in FIGS. 9 and 15. The optical element 2 is divided into four sections as shown in FIG. 9; for these sections, rotational symmetry through an angle of about 90° with respect to the optical axis 3 acting as (main) symmetry axis 3' (of the shape of the sections) is given. One or more of the sections, here section 15, is additionally structured by subsections 15a, 15b that have the shape of segments of a ring centered around a further symmetry axis 3" shifted with respect to the optical axis 3.

The other sections 14, 16, 17 may be sub-divided as well, with rotational symmetry with respect to one of the symmetry axes 3', 3" or to even further symmetry axes. Furthermore, symmetry axes 3\* and **3\*\* of sections 14 and 16, respectively, are indicated in FIG. 16. They are symmetry axes of a rotational symmetry of the pattern of the optical microstructures in the respective sections 14, 16. These symmetry axes 3\*, 3\*\* of the microstructure patterns are parallel to optical axis 3**.

Figure 17:
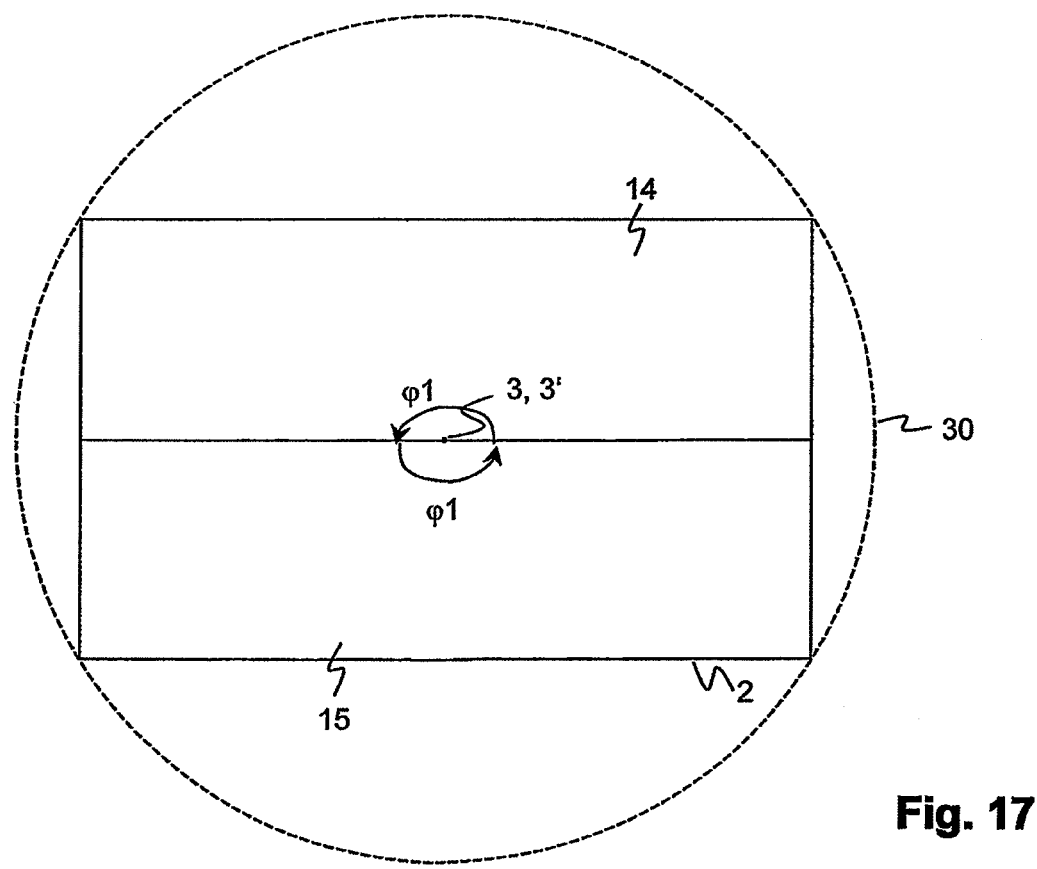
FIG. 17 shows an embodiment with two sections corresponding to two sectors of a circle with an opening angle of 180°.

FIG. 17 shows another example for an optical element 2 according to the invention. The rectangular element 2 comprises two sections 14, 15 having the shape of rectangular stripes. The two sections 14, 15 may also be seen as two (truncated) sectors of a circle around the optical axis 3, each having an opening angle θ1 of 180°. As in FIG. 9, the circle 30 is purely imaginary and is shown to illustrate the symmetry condition only. It does not necessarily correspond to any physical element of the lens 2. However, a circular optical element 2 is also possible.

Figure 18:
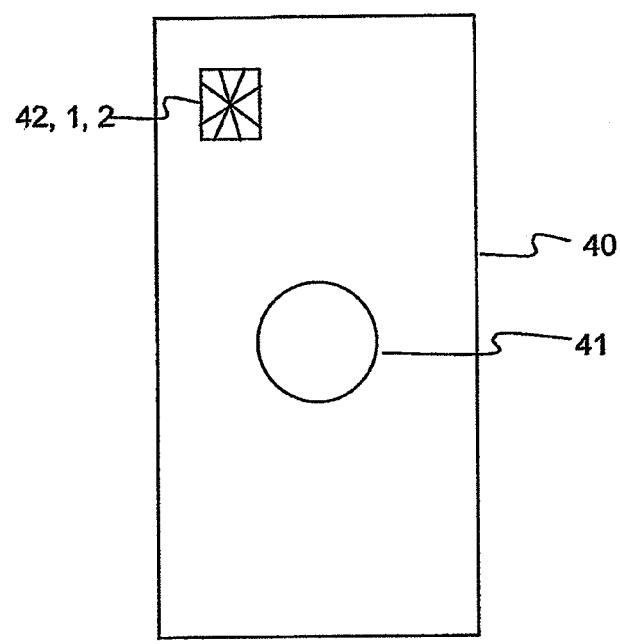
FIG. 18 shows a mobile communication device with a flash light comprising a collimating lens.

FIG. 18 shows a mobile telephone 40 having a camera with an objective 41 and a flash light 42 that comprises an illumination system 1 according to the invention. The invention allows manufacture of an illumination system that is very thin at low costs, as the optical element 2 can be as thin as 300 mm and can be manufactured in a mass production process. Therefore, it can be integrated even in thin mobile devices. Application for digital cameras is also possible.

The output distribution is preferably generally rectangular that preferably has 4:3 or 16:9 aspect ratio between width and height. The distribution is preferably as uniform as possible. Typically this is defined in a plane at 1 mm distance away from the optics. The output distribution is approximately 30 degrees wide and approx 20 degrees high in case of a 4:3 aspect ratio.

The optical element 2 use comprises at least eight sections that are preferably arranged like in FIG. 11. The sections are grouped in three groups; in terms of FIG. 11 these groups are sections 14&16, sections 15&17 and sections 18,19,20,21. Each group has its own function, which typically create distributions similar to the ones shown in FIG. 12a-c.

The number of sections may be higher in some cases. In such a case one starts with the eight sections like in FIG. 11 and splits the sections in one or more groups into two and then regroups the segments according to the same principle used for original grouping.

The microstructures inside a section are rotationally symmetric with respect to the optical axis. Inside each segment the microstructure is such that the local lateral size of the structure is largest at the center of the element (near the optical axis) and typically gets smaller when moving towards the edge. The local lateral size corresponds to the peak-to-peak distance in a geometry as shown in FIG. 3 or 4.

What is claimed is:

1. An illumination system comprising a light source and a rectangular-shaped optical element that influences light emitted by the a light emitting surface of the light source and the optical element being centered on an optical axis, wherein the optical element has a first surface directed towards the light source and a second surface pointing away from the light source, wherein at least one of said first and second surfaces is structured by at least one of diffraction and refraction type optical microstructures to achieve a light output distribution having different widths in an x-direction and a y-direction, said x-direction and y-direction being mutually perpendicular directions that are both perpendicular to the optical axis, wherein the optical element has four sections each of which has optical microstructures, wherein a pattern of the optical microstructures in each of the sections is, at least over a predetermined angular range, rotationally symmetric with respect to at least one symmetry axis, wherein non-neighboring ones of the sections, respectively, are congruent with respect to each other such that the pattern of optical microstructures is the same for each pair of non-neighboring sections, but is different for neighboring sections.

2. The illumination system according to claim 1, wherein the light output distribution is a rectangular light output distribution.

3. The illumination system according to claim 1, wherein the light output distribution has an aspect ratio between the widths in the x- and the y-direction of 4:3 or 16:9.

4. The illumination system according to claim 1, wherein the at least one symmetry axis corresponds to the optical axis.

5. The illumination system according to claim 1, wherein the at least one symmetry axis is parallel to, but spaced from, the optical axis.

6. The illumination system according to claim 5, wherein the at least one symmetry axis corresponds to an axis shifted to infinity.

7. The illumination system according to claim 1, wherein the patterns of the optical microstructures in the at least two sections have different symmetry axes.

8. The illumination system according to claim 1, wherein each section has the shape of at least one of a truncated circular disc, a truncated circular ring, a sector of a circular disc, a sector of a circular ring, a stripe with two parallel straight bordering lines, and segments of such shapes.

9. The illumination system according to claim 1, wherein the pattern of the optical microstructures in a first and a second section is rotationally symmetric with respect to the optical axis over an angular range of less than 360°.

10. The illumination system according to claim 1, wherein the pattern of the optical microstructures in a first and a second section is rotationally symmetric with respect to the optical axis over an angular range of at least 10°.

11. The illumination system according to claim 1, wherein the pattern of the optical microstructures in a first and a second section is rotationally symmetric with respect to the optical axis over an angular range of between 30° and 180°.

12. The illumination system according to claim 9, wherein the optical properties of the at least two sections are such that incident light is deflected toward the optical axis, and wherein the deflection toward the optical axis is different between neighboring sections.

13. The illumination system according to claim 9, wherein each of the sections comprises a pattern of optical microstructures that is rotationally symmetric with respect to the optical axis over an angular range of 70° to 110°.

14. The illumination system according to claim 1, wherein the symmetry axis coincides with the optical axis.

15. The illumination system according to claim 1, wherein at least one surface of the optical element comprises a profile with characteristic profile depths and profile widths of the order of one to a few ten wavelengths of the light source in order to form the optical microstructures.

16. The illumination system according to claim 15, wherein at the characteristic profile depths and profile widths are between 0.5 µm and 250 µm.

17. The illumination system according to claim 1, wherein the light source is an electroluminescent element.

18. The illumination system according to claim 1, wherein the optical element is at least partially transparent and arranged at a predetermined distance to a light emitting surface of the light source.

19. The illumination system according to claim 1, wherein the light source and the optical element are arranged in a common housing in order to maintain a given spatial relationship between the light source and the optical element.

20. The illumination system according to claim 1, wherein the optical element comprises an at least partially transparent layer with optical microstructures in at least one of a front surface or a back surface of said layer.

21. The illumination system according to claim 1, wherein the light source is light emitting diode.

22. The Illumination system according to claim 1, wherein the light source and the optical element are connected by an at least partially transparent substrate in order to maintain a given spatial relationship between the light source and the optical element.

* * * * *